United States Patent
Watanabe et al.

(10) Patent No.: US 12,240,524 B2
(45) Date of Patent: Mar. 4, 2025

(54) VEHICLE REAR PORTION STRUCTURE

(71) Applicant: HONDA MOTOR CO., LTD., Tokyo (JP)

(72) Inventors: Yasunori Watanabe, Wako (JP); Satoru Kawabe, Wako (JP); Masayasu Yoshida, Wako (JP); Atsushi Hasegawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 314 days.

(21) Appl. No.: 17/841,702

(22) Filed: Jun. 16, 2022

(65) Prior Publication Data

US 2023/0001987 A1   Jan. 5, 2023

(30) Foreign Application Priority Data

Jul. 1, 2021   (JP) ................. 2021-110186

(51) Int. Cl.
  *B62D 25/08*   (2006.01)
  *B62D 21/15*   (2006.01)

(52) U.S. Cl.
  CPC ................. *B62D 21/152* (2013.01)

(58) Field of Classification Search
  CPC .. B62D 21/152; B62D 25/08; B62D 25/2027; B62D 21/155; B60R 19/18; B60R 19/24
  USPC .......... 296/187.11, 193.08, 203.04; 293/132, 293/133
  See application file for complete search history.

(56) References Cited

U.S. PATENT DOCUMENTS

| | | | |
|---|---|---|---|
| 6,206,461 B1 * | 3/2001 | Gaiser ................. | B62D 21/155 296/204 |
| 6,834,910 B2 * | 12/2004 | Wendland .............. | B62D 25/20 296/203.04 |
| 2003/0132608 A1 | 7/2003 | Aquinto et al. | |
| 2003/0173799 A1 | 9/2003 | Wendland et al. | |
| 2016/0052556 A1 | 2/2016 | Kano et al. | |
| 2019/0367098 A1 * | 12/2019 | Miyake ................ | B62D 29/005 |

FOREIGN PATENT DOCUMENTS

| | | |
|---|---|---|
| EP | 2896535 | 7/2015 |
| JP | 10-006863 | 1/1998 |
| JP | 2007-137326 | 6/2007 |

(Continued)

OTHER PUBLICATIONS

Japanese Office Action for Japanese Parent Application No. 2021-110186 mailed Dec. 20, 2022.

(Continued)

*Primary Examiner* — Amy R Weisberg
*Assistant Examiner* — Whitney Nicole Francis
(74) *Attorney, Agent, or Firm* — Amin, Turocy & Watson, LLP (57) ABSTRACT

A vehicle rear portion structure includes: a center frame that is disposed closer to a center portion of a vehicle in a vehicle width direction than both side portions of the vehicle in the vehicle width direction, that is disposed on a rear side in the vehicle, and that extends in a front-rear direction of the vehicle; and a bumper beam that is disposed on a rear side of the center frame to be next to the center frame, that is disposed at a position which overlaps the center frame when viewed from a front-rear direction, and that is configured to be crushable due to a rear collision load.

7 Claims, 6 Drawing Sheets

(56) References Cited

FOREIGN PATENT DOCUMENTS

| | | |
|---|---|---|
| JP | 2008-174122 | 7/2008 |
| JP | 2014-004850 | 1/2014 |
| JP | 2016-010982 | 1/2016 |
| JP | 2016-043829 | 4/2016 |
| JP | 2019-156063 | 9/2019 |
| JP | 2020-199842 | 12/2020 |

OTHER PUBLICATIONS

Japanese Office Action for Japanese Patent Application No. 2021-110186 mailed Jun. 6, 2023.

* cited by examiner

VEHICLE REAR PORTION STRUCTURE

CROSS-REFERENCE TO RELATED APPLICATION

Priority is claimed on Japanese Patent Application No. 2021-110186, filed Jul. 1, 2021, the content of which is incorporated herein by reference.

BACKGROUND OF THE INVENTION

Field of the Invention

This invention relates to a vehicle rear portion structure.

Description of Related Art

As a vehicle rear portion structure of an automobile or the like, a technique is disclosed including a bumper beam extending in a vehicle width direction along a rear bumper and load absorbing portions respectively extending forward from both side portions in the vehicle width direction of the bumper beam (see, for example, JP 2020-199842 A). Front end portions of the load absorbing portions are respectively joined to rear end portions of side frames provided on both side portions in the vehicle width direction of a rear floor and extending in a front-rear direction.

Under such a constitution, when a load (rear collision load) is applied from behind the vehicle to the rear portion of the vehicle, the bumper beam is firstly bent and deformed to receive the rear collision load. After that, the rear collision load that cannot be completely received by the bumper beam is transmitted to the load absorbing portions, and the load absorbing portions receive the rear collision load.

SUMMARY OF THE INVENTION

Here, in the above-described conventional technique, the rear collision load that can be absorbed by the bumper beam is limited to a very small load. Most of the rear collision load cannot be completely absorbed by bending and deforming of the bumper beam, and is received by the load absorbing portions. For this reason, the rear collision load is received by bending and deforming of the bumper beam, until the rear collision load is applied to the load absorbing portions. Hence, there is a problem that it takes time to reach a peak load of the rear collision load, and the peak load tends to increase.

In addition, there is a problem that the rear collision load applied to the bumper beam is hardly transmitted to the load absorbing portions, and the rear collision load cannot be efficiently absorbed.

Moreover, the load absorbing portions are respectively provided on both side portions in the vehicle width direction of the vehicle. For this reason, in a case where the position to which the rear collision load is applied is shifted from the center in the vehicle width direction of the rear portion of the vehicle, the rear collision load applied to each load absorbing portion may vary. As a result, there is a possibility that the side frames are damaged more than necessary, because the rear collision load cannot be completely absorbed by the load absorbing portions.

According to an aspect of the present invention, a vehicle rear portion structure capable of suppressing the peak load of the rear collision load and efficiently absorbing the rear collision load is provided.

(1) A vehicle rear portion structure (for example, a vehicle rear portion structure 1 in an embodiment) according to one aspect of the present invention includes: a center frame (for example, a center frame 15 in an embodiment) that is disposed closer to a center portion of a vehicle (for example, a vehicle 100 in an embodiment) in a vehicle width direction than both side portions of the vehicle in the vehicle width direction, that is disposed on a rear side in the vehicle, and that extends in a front-rear direction of the vehicle; and a bumper beam (for example, a bumper beam 21 in an embodiment) that is disposed on a rear side of the center frame to be next to the center frame, that is disposed at a position which overlaps the center frame when viewed from a front-rear direction, and that is configured to be crushable due to a rear collision load.

With the constitution as the above aspect (1), the bumper beam receives the rear collision load while being crushed. Furthermore, the rear collision load is transmitted to the center frame, while the bumper beam is being crushed. The center frame extends in the front-rear direction, and thus the mechanical strength of the center frame is easily ensured. As a result, the center frame is capable of receiving the rear collision load with certainty. Therefore, from the moment when the rear collision load is applied to the bumper beam, while the bumper beam is caused to be certainty crushed to certainty absorb the rear collision load, the center frame is capable of receiving the rear collision load. In addition, even in a case where an input position of the rear collision load is somewhat shifted from the center in the vehicle width direction, the rear collision load is firstly transmitted to the center frame. Accordingly, the peak load of the rear collision load can be suppressed, and the rear collision load can be efficiently absorbed.

(2) The constitution in the above aspect (1) may further include a rear panel (for example, a rear panel 20 in an embodiment) provided between the center frame and the bumper beam, in which the bumper beam may be connected with the center frame via the rear panel.

With the constitution as the above aspect (2), the rear collision load applied to the bumper beam can also be transmitted to the rear panel. In this manner, the rear collision load applied to the bumper beam can also be distributed to the rear panel in addition to the center frame. Therefore, the rear collision load is not concentrated on any specific component part of the vehicle other than the bumper beam. As a result, damage to the vehicle due to the rear collision load can be suppressed with certainty.

(3) The constitution in the above aspect (2) may further include: a cross member (for example, a cross member 18 in an embodiment) that is disposed in front of the center frame, and that extends in the vehicle width direction; and side frames (for example, rear side frames 2 in an embodiment) respectively disposed on both side portions of the vehicle in the vehicle width direction, in which a front portion (for example, a front end portion 15b in an embodiment) of the center frame is connected with the cross member, and both end portions of the cross member in the vehicle width direction may be respectively connected with rear portions (for example, rear end portions 2a in an embodiment) of the side frames.

With the constitution as the above aspect (3), the rear collision load can be transmitted to the cross member through the center frame, and further, the rear collision load can be transmitted to the side frames disposed on both side portions in the vehicle width direction. Via the center frame, the rear collision load can be equally distributed to both side frames. Therefore, damage to the vehicle due to the rear collision load can be suppressed with more certainty.

(4) In the constitution in the above aspect (3), the cross member may extend obliquely gradually forward from the center frame as approaching both outer sides in the vehicle width direction.

With the constitution as the above aspect (4), the rear collision load applied to the center frame can be easily transmitted to both side frames, as compared with a case where the cross member extends linearly in the vehicle width direction.

(5) In the constitution in the above aspect (4), the center frame may extend linearly in the front-rear direction.

With the constitution as the above aspect (5), the rear collision load applied to the center frame can be transmitted to the cross member with certainty, as compared with a case where the center frame is formed in a bent manner. Therefore, the rear collision load can be distributed with certainty to the entire rear portion of the vehicle.

(6) In the constitution in the above aspect (2), the center frame, the bumper beam, and the rear panel may be fixed at an identical position.

With the constitution as the above aspect (6), the rear collision load applied to the bumper beam can be transmitted to the center frame more efficiently.

(7) The constitution in the above aspect (1) may further include a rear floor panel (for example, a rear floor panel 5 in an embodiment) disposed at a rear portion of the vehicle, in which the rear floor panel may be constituted by a double panel structure (for example, a double panel structure 10 in an embodiment) including an upper panel (for example, an upper panel 11 in an embodiment) and a lower panel (for example, a lower panel 12 in an embodiment) disposed below the upper panel, and the center frame may be provided on a lower surface (for example, a lower surface 11d in an embodiment) of the upper panel.

With the constitution as the above aspect (7), the load applied to the bumper beam can also be transmitted to the rear floor panel. The rear floor panel is constituted by the double panel structure, and thus the rear collision load can be further distributed on the rear panel. Therefore, damage to the vehicle due to the rear collision load can be suppressed with more certainty.

(8) In the constitution in the above aspect (7), the bumper beam may be formed in a bent manner so as to bulge rearward between the upper panel and the lower panel, an upper fixing portion (for example, an upper fixing portion 21d in an embodiment) of the bumper beam may be shifted in an up-down direction with respect to a rear end (for example, a flange portion 19a in an embodiment) of the upper panel, and a lower fixing portion (for example, a lower fixing portion 21e in an embodiment) of the bumper beam may be shifted in the up-down direction with respect to a rear end (for example, a flange portion 19b in an embodiment) of the lower panel.

With the constitution as the above aspect (8), the rear collision load can be preferentially transmitted to the center frame than the upper panel and the lower panel. That is, the positions of the respective fixing portions of the bumper beam are shifted from the positions of the rear end of the upper panel and the rear end of the lower panel, and thus the rear collision load applied to the bumper beam is not efficiently transmitted to each of the panels. On the other hand, the rear collision load is efficiently transmitted to the center frame. As a result, the function of the center frame can be exhibited sufficiently.

In addition, in integrating the center frame, the bumper beam, the rear panel, and the floor panel, for example, when spot welding is adopted, it is possible to avoid spot welding with all of the center frame, the bumper beam, the rear panel, and each of the floor panels being overlapped. Therefore, it is possible to suppress a decrease in strength of the spot welding.

According to an aspect of the present invention, the peak load of the rear collision load at the rear portion of the vehicle can be suppressed, and the rear collision load can be efficiently absorbed.

DETAILED DESCRIPTION OF THE INVENTION

Hereinafter, embodiments of the present invention will be described, based on the drawings. In the following description, a front side in a traveling direction of a vehicle 100 is simply referred to as a front side, a rear side of the vehicle 100 is simply referred to as a rear side, vertical up-down directions are referred to as an upper side and a lower side, and a vehicle width direction of the vehicle 100 is referred to as a vehicle width direction or a left-right direction. An arrow FR pointing to the front side of the vehicle 100, an arrow UP pointing to the upper side of the vehicle 100, and an arrow LH pointing to a left lateral side of the vehicle are given at appropriate positions in each of the drawings to be described below. In addition, in the following description, join means joining by welding such as spot welding.

Vehicle Rear Portion Structure

Figure 1:
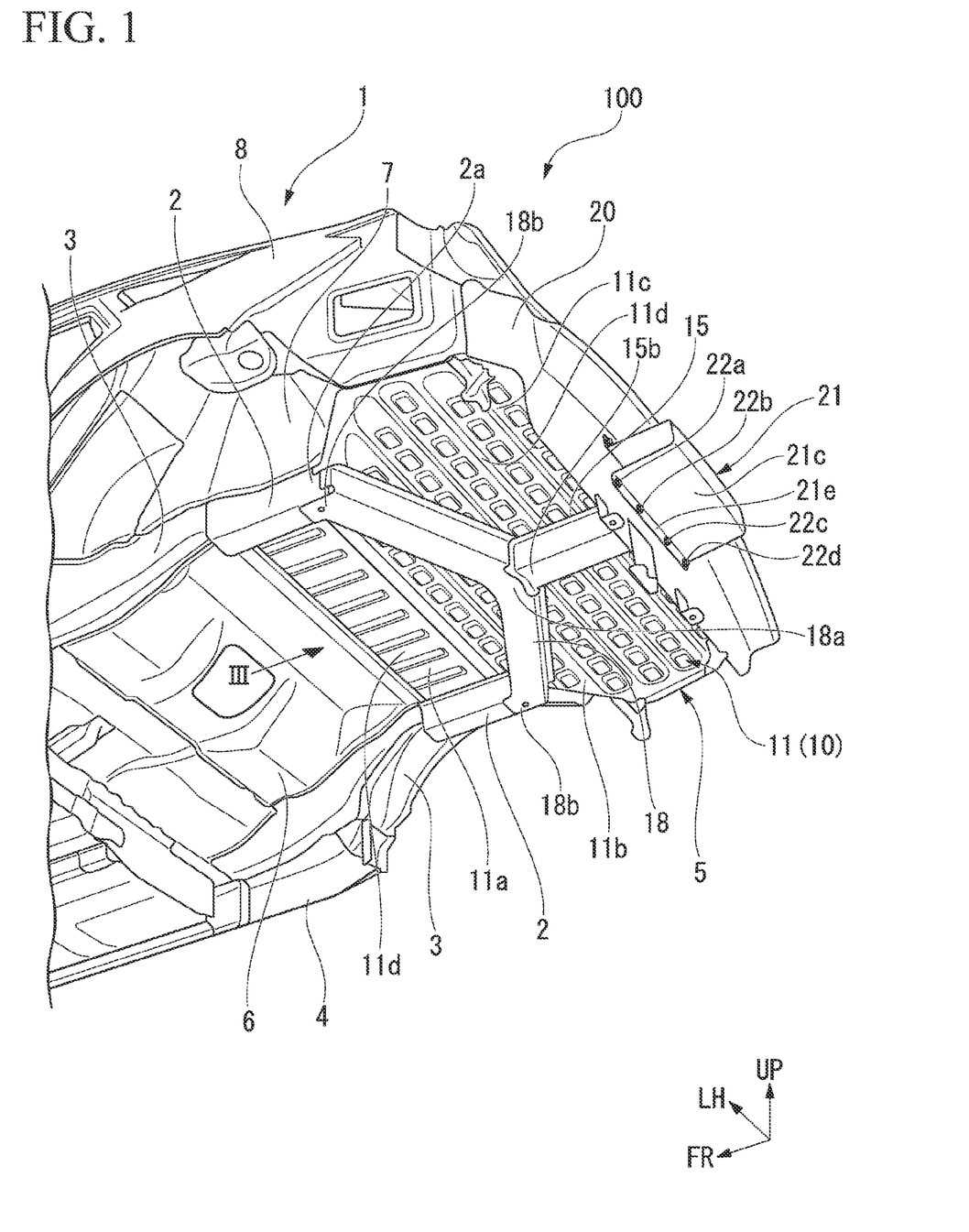
FIG. 1 is a perspective view of a lower side of a vehicle rear portion structure in an embodiment of the present invention, when viewed obliquely from a rear left side.
Figure 2:
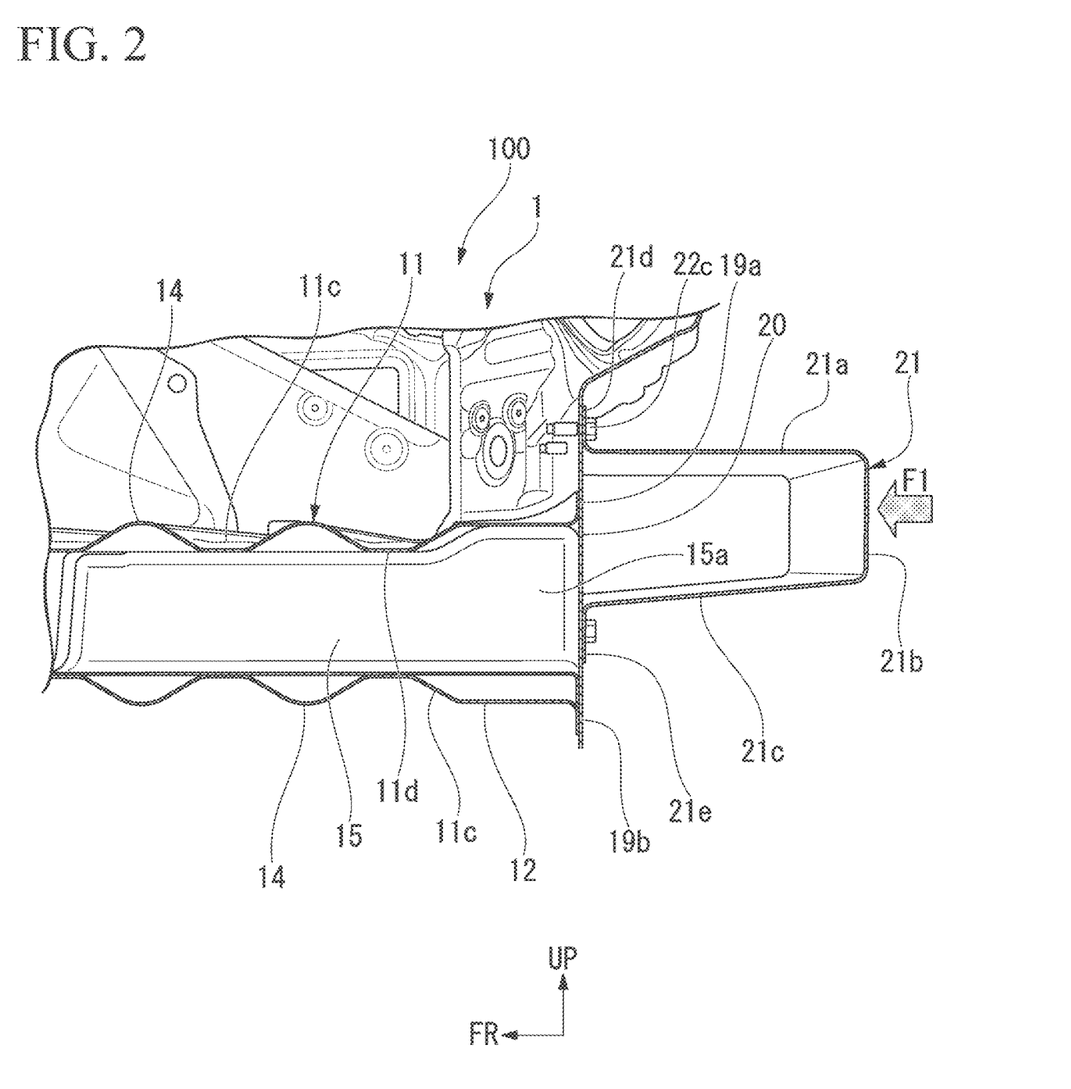
FIG. 2 is a cross-sectional view, taken along a front-rear direction and an up-down direction, illustrating the center and its vicinity in a vehicle width direction of the vehicle rear portion structure in an embodiment of the present invention.

FIG. 1 is a perspective view of a lower side of a rear portion structure 1 of the vehicle 100 (hereinafter, referred to as a vehicle rear portion structure 1), when viewed obliquely from a rear left side. In FIG. 1, illustrations of some component parts (particularly, a lower panel 12) are omitted so as to make the description easy to understand. FIG. 2 is a cross-sectional view, taken along a front-rear direction and an up-down direction, illustrating the center and its vicinity in a vehicle width direction of the vehicle rear portion structure 1.

As illustrated in FIGS. 1 and 2, in the vehicle rear portion structure 1, a pair of rear side frames 2 extending along the front-rear direction are provided on both left and right sides. Rear ends of a pair of reinforcements 3 extending gradually downward as approaching a front side are respectively joined to front ends of the pair of rear side frames 2. The front ends of the pair of reinforcements 3 are respectively joined to the rear ends of a pair of side sills 4 extending in the front-rear direction.

A front region of a rear floor panel 5 is joined to the pair of rear side frames 2. The rear floor panel 5 is constituted by a double panel structure 10 including an upper panel 11 and a lower panel 12, which are disposed to face each other in the up-down direction, and which extend horizontally.

The upper panel 11 and the lower panel 12 are constituted to have substantially identical shapes, and for example, are partially inverted from each other in the up-down direction. Therefore, in the following description, only the upper panel 11 will be described, and the lower panel 12 will be described as necessary. In the lower panel 12, a part having the same constitution to that of the upper panel 11 will be described with the same name and the same reference numeral as that of the upper panel 11 as necessary.

The upper panel 11 and the lower panel 12 are formed of, for example, a plate made of aluminum or the like.

The upper panel 11 includes a narrow width portion 11a extending across the pair of rear side frames 2, a front-side wide portion 11b extending rearward from a rear portion of the narrow width portion 11a, and a rear-side wide portion 11c further extending rearward from a rear portion of the front-side wide portion 11b.

A plurality of front-side projecting strip portions 13 are formed in the narrow width portion 11a. The front-side projecting strip portions 13 each extend in the front-rear direction, and are disposed to be next to each other in the vehicle width direction. The front-side projecting strip portions 13 are each formed such that the upper side is projected and a lower surface 11d side of the upper panel 11 is recessed.

The front-side wide portion 11b is formed such that the width in the vehicle width direction is gradually wider than that of the narrow width portion 11a as approaching the rear side. The rear-side wide portion 11c is formed to have an identical width to that of the rear portion of the front-side wide portion 11b in the vehicle width direction.

A plurality of rear-side projecting strip portions 14 are formed in the front-side wide portion 11b and the rear-side wide portion 11c. The rear-side projecting strip portions 14 each extend in the vehicle width direction, and are disposed to be next to each other in the front-rear direction. The rear-side projecting strip portions 14 are each formed such that a lower surface 11d side of the upper panel 11 is projected and the upper side is recessed.

A flange portion 19a, which is bent to extend upward, is formed at a rear end portion of the upper panel 11. A flange portion 19b, which is bent to extend downward, is formed at a rear end portion of the lower panel 12. These flange portions 19a and 19b are disposed on an identical plane along the left-right direction and the up-down direction. Each of the flange portions 19a and 19b is overlapped and joined to a rear panel 20 to be described later.

A front floor panel 6 is joined to the pair of reinforcements 3 and the pair of side sills 4, extends across the pair of reinforcements 3 and the pair of side sills 4, and extends along the shapes of the pair of reinforcements 3 and the pair of side sills 4. A front portion of the upper panel 11 in the rear floor panel 5 and a rear portion of the front floor panel 6 are joined to each other. In this manner, the rear floor panel 5 is located on an upper side of the front floor panel 6. A tire, not illustrated, is accommodated in a space ensured below the rear floor panel 5.

In addition, a rear wheel house 7 is provided above the rear side frames 2 and the reinforcements 3. A rear lower edge of the rear wheel house 7 is joined to left and right edge portions of the front-side wide portion 11b of the upper panel 11.

An outer panel 8 is joined to left and right edge portions of the rear-side wide portion 11c of the upper panel 11 and the entire circumference of an upper portion of the rear wheel house 7.

Figure 3:
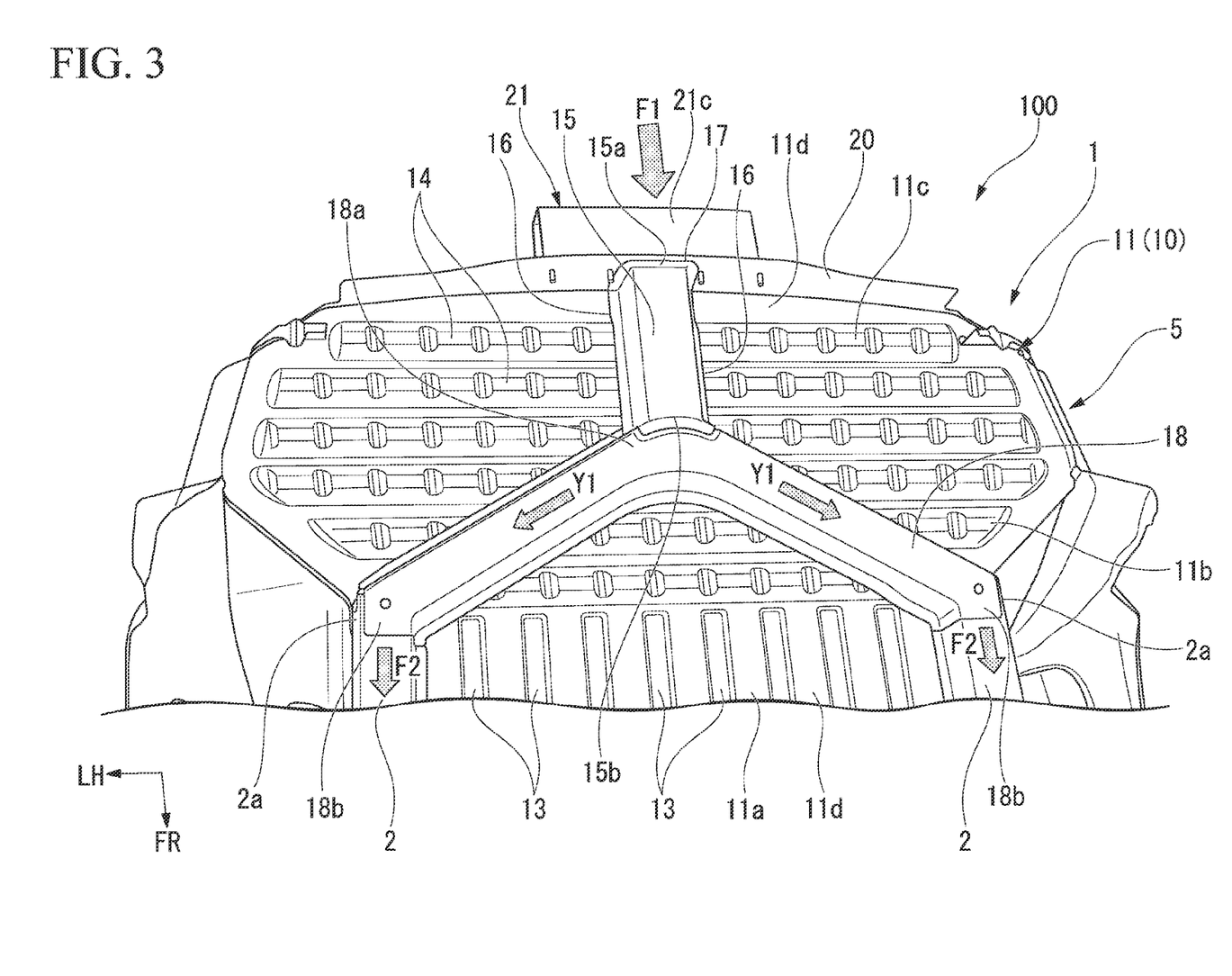
FIG. 3 is an arrow view when viewed in an arrow III of FIG. 1.

FIG. 3 is an arrow view when viewed in an arrow III of FIG. 1.

As illustrated in FIGS. 1 and 3, the lower surface 11d of the upper panel 11 is provided with a center frame 15 linearly extending in the front-rear direction at the center in the vehicle width direction of the rear-side wide portion 11c. That is, the center frame 15 is disposed between the upper panel 11 and the lower panel 12.

The center frame 15 is formed in a letter C shape, an upper side of which is opened in a cross-sectional shape along the vehicle width direction. The center frame 15 can be formed by, for example, aluminum extrusion molding or by pressing a metal plate. First outer flange portions 16 bent to extend outward in the vehicle width direction are formed at both left and right side edges of the center frame 15. These first outer flange portions 16 are joined to overlap the lower surface 11d of the upper panel 11. Accordingly, a closed cross-section is formed of the center frame 15 and the upper panel 11.

In addition, a second outer flange portion 17, which extends out downward and in the vehicle width direction from the periphery of the center frame 15, is formed at a rear end portion 15a of the center frame 15. The second outer flange portion 17 is fastened and fixed with overlapped on the rear panel 20 to be described later.

A cross member 18 is joined to a front end portion 15b of the center frame 15. The cross member 18 is disposed on the lower surface 11d of the upper panel 11 and on the front-side wide portion 11b. That is, the cross member 18 is also disposed between the upper panel 11 and the lower panel 12.

The cross member 18 can be manufactured by, for example, aluminum extrusion molding or by pressing a metal plate. The cross member 18 extends in the vehicle width direction while being bent. More specifically, the cross member 18 extends obliquely gradually forward from the center frame 15 as approaching both outer sides in the vehicle width direction. That is, the cross member 18 has a bifurcated shape formed in a bent manner so as to project rearward, when viewed from the up-down direction. A bending portion 18a of the cross member 18 is joined to the front end portion 15b of the center frame 15.

Both left and right end portions 18b of the cross member 18 are respectively joined to rear end portions 2a of the rear side frames 2.

The cross member 18 is branched from the front end portion 15b of the center frame 15 to the rear end portions 2a of the rear side frames 2. Thus, the cross member 18 has a symmetric shape with respect to the center in the vehicle width direction.

Such a cross member 18 is formed in a letter C shape, the upper side of which is opened in a cross-sectional shape along a direction orthogonal to the extending direction and along the up-down direction. Accordingly, a closed cross-section is formed of the cross member 18 and the upper panel 11.

Figure 4:
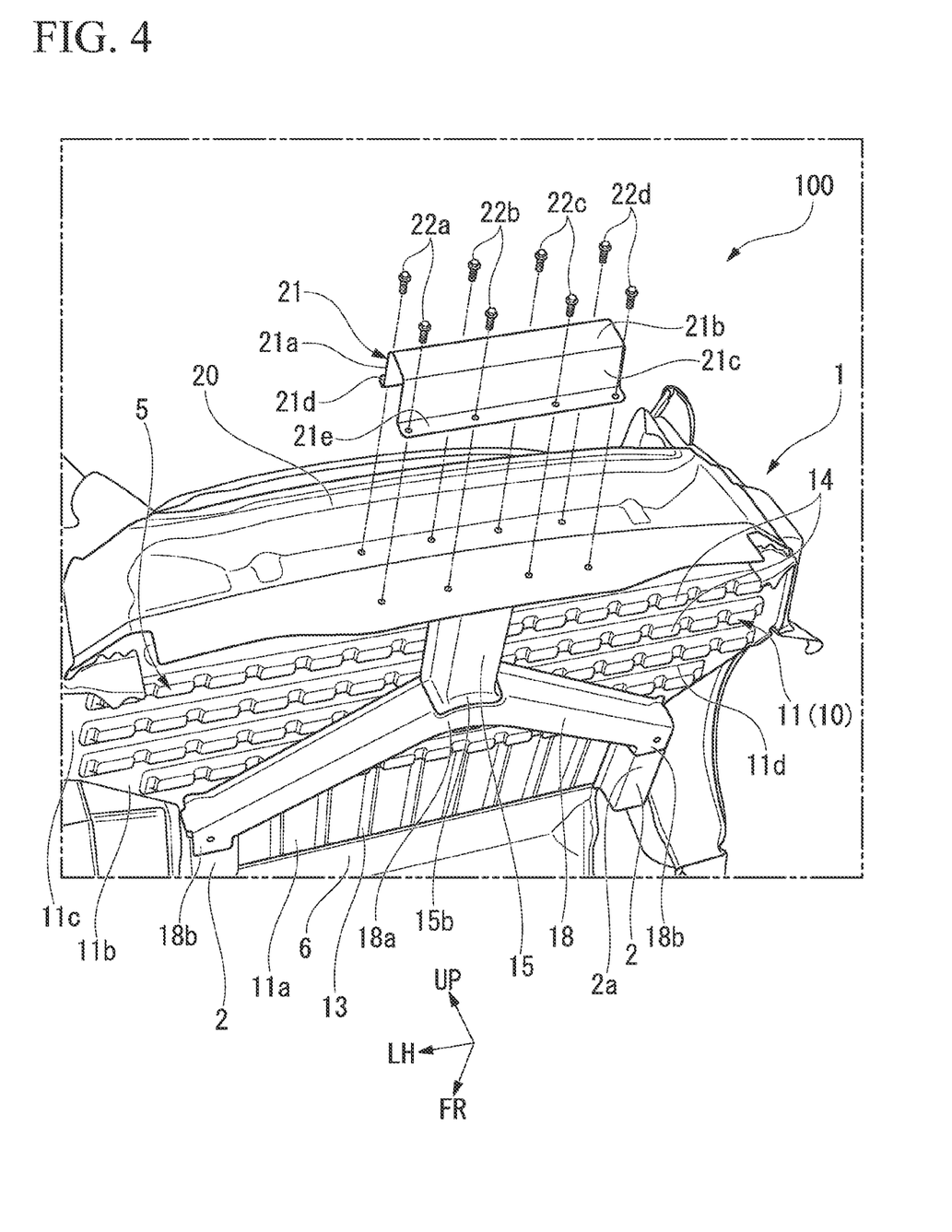
FIG. 4 is a partially exploded perspective view of a lower side of the vehicle rear portion structure, when viewed obliquely from a rear side in an embodiment of the present invention.

FIG. 4 is a partially exploded perspective view of the lower side of the vehicle rear portion structure 1, when viewed obliquely from a lower side. In FIG. 4, the illustration of the lower panel 12 is omitted.

As illustrated in FIGS. 2 to 4, the rear panel 20 is provided at rear end portions of the rear floor panel 5 (the upper panel 11 and the lower panel 12) and the center frame 15. The rear panel 20 is a metal panel extending along the left-right direction and the up-down direction. Each of the flange portions 19a and 19b of the rear floor panel 5 (the upper panel 11 and the lower panel 12) is joined to a front surface of the rear panel 20.

In addition, the second outer flange portion 17 of the center frame 15 is overlapped on the front surface of the rear panel 20. The second outer flange portion 17 of the center frame 15 is overlapped on the rear panel 20 and a bumper beam 21 disposed on a rear surface of the rear panel 20, and is then fastened and fixed together with bolts and nuts 22b and 22c (details will be described later).

The bumper beam 21 is formed to extend along the vehicle width direction. The length of the bumper beam 21 in the vehicle width direction is approximately three times the width of the center frame 15 in the vehicle width direction. The bumper beam 21 is disposed at the center in the vehicle width direction of the rear panel 20. Therefore, the bumper beam 21 is disposed at a position overlapping the center frame 15, when viewed from the front-rear direction.

The bumper beam 21 is formed in a letter C shape, the front side of which is opened in a cross-sectional shape along the front-rear direction and the up-down direction. In other words, on a rear surface of the rear panel 20, the bumper beam 21 is formed in a bent manner so as to bulge rearward from a position corresponding to the upper panel 11 until a position corresponding to the lower panel 12. That is, the bumper beam 21 includes an upper wall portion 21a extending rearward from a position corresponding to the upper panel 11 on the rear surface of the rear panel 20, a rear wall portion 21b bent to extend downward from a rear edge of the upper wall portion 21a, and a lower wall portion 21c bent to extend forward from the rear wall portion 21b and to reach a position corresponding to the lower panel 12.

The bumper beam 21 formed in this manner can be formed by, for example, pressing a metal plate. The bumper beam 21 may be formed by aluminum extrusion molding or the like. The bumper beam 21 is constituted to be crushable due to a load applied from behind (hereinafter, referred to as a rear collision load).

An upper fixing portion 21d bent to extend upward from a front edge is formed in the upper wall portion 21a of the bumper beam 21. A lower fixing portion 21e bent to extend downward from a front edge is formed in the lower wall portion 21c of the bumper beam 21. These fixing portions 21d and 21e are overlapped on a rear surface of the rear panel 20.

The position of the upper fixing portion 21d is shifted upward from the position of the flange portion 19a of the upper panel 11. The position of the lower fixing portion 21e is shifted upward from the position of the flange portion 19b of the lower panel 12.

The upper fixing portion 21d of the bumper beam 21 disposed in this manner is fastened and fixed to the rear panel 20 with four bolts and nuts 22a to 22d. The four bolts and nuts 22a to 22d are disposed at equal intervals along the vehicle width direction. The lower fixing portion 21e is also fastened and fixed to the rear panel 20 with the four bolts and nuts 22a to 22d.

Among the four bolts and nuts 22a to 22d for fastening and fixing the lower fixing portion 21e, the two bolts and nuts 22b and 22c at the center in the vehicle width direction are disposed at positions overlapping the second outer flange portion 17 of the center frame 15 in the front-rear direction. Accordingly, the second outer flange portion 17 of the center frame 15, the rear panel 20, and the bumper beam 21 overlap one another at an identical position, and are each fastened and fixed together with the two bolts and nuts 22b and 22c. The bumper beam 21 is connected with the center frame 15 through the rear panel 20. Note that although an illustration is omitted, a rear bumper that serve as an exterior extends over the entire vehicle width direction on a rear side of the bumper beam 21.

Operations of Vehicle Rear Portion Structure

Next, operations of the vehicle rear portion structure 1 will be described, based on FIGS. 2 and 3.

When a rear collision load F1 is applied to the vehicle rear portion structure 1, the rear collision load F1 is firstly applied to the bumper beam 21. Here, the center frame 15 is disposed on a front side of the bumper beam 21. The center frame 15 extends linearly in the front-rear direction, and thus the mechanical strength of the center frame 15 is easily ensured. Therefore, the forward displacement of the bumper beam 21 is restricted by the center frame 15. As a result, the bumper beam 21 receives the rear collision load F1, while the bumper beam 21 is being crushed. In other words, according to the bumper beam 21 being crushed, the rear collision load F1 is absorbed by the bumper beam 21.

In addition, while the bumper beam 21 is receiving the rear collision load F1, the rear collision load F1 is transmitted to the center frame 15. As a result, the center frame 15 also receives the rear collision load F1. A cross member 18 is joined to a front end portion 15b of the center frame 15. The cross member 18 is formed in a bifurcated shape. Then, both the left and right end portions 18b of the cross member 18 are respectively joined to the rear end portions 2a of the rear side frames 2. Therefore, the rear collision load F1 is transmitted to the cross member 18 through the center frame 15 (see arrows Y1 in FIG. 3). Furthermore, the rear collision load F1 is distributed and transmitted to the left and right rear side frames 2 through the cross member 18 (see arrows F2 in FIG. 3).

The cross member 18 is formed to be symmetric with respect to the center in the vehicle width direction, and thus the rear collision load F1 received by the center frame 15 can be easily distributed equally to the left and right rear side frames 2. In addition, the cross member 18 extends obliquely gradually forward from the center frame 15 as approaching both outer sides in the vehicle width direction. Therefore, the rear collision load F1 received by the center frame 15 is easily transmitted to the left and right rear side frames 2 through the cross member 18.

In addition, the bumper beam 21 is attached to a rear surface of the rear panel 20, and thus the rear collision load F1 applied to the bumper beam 21 is also transmitted to the rear panel 20. Furthermore, the rear collision load F1 is also transmitted to the rear floor panel 5 (the upper panel 11 and the lower panel 12) through the rear panel 20.

Here, the position of the upper fixing portion 21d in the bumper beam 21 is shifted upward from the position of the flange portion 19a of the upper panel 11. The position of the lower fixing portion 21e is shifted upward from the position of the flange portion 19b of the lower panel 12. Therefore, the rear collision load F1 applied to the bumper beam 21 is less likely to be directly or efficiently transmitted to each of the panels 11 and 12. On the other hand, the second outer flange portion 17 of the center frame 15 and the lower fixing portion 21e of the bumper beam 21 overlap each other in the front-rear direction. As a result, the rear collision load F1 is preferentially transmitted to the center frame 15 compared to the panels 11 and 12.

Each of the panels 11 and 12 operates as follows against the rear collision load F1 applied to each of the panels 11 and 12. That is, the plurality of rear-side projecting strip portions 14 extending in the vehicle width direction are formed in the front-side wide portion 11b and the rear-side wide portion 11c of each of the panels 11 and 12. Therefore, the front-side wide portion 11b and the rear-side wide portion 11c are weak in mechanical strength against the load applied from the front-rear direction in contrast to the load applied from the left-right direction.

On the other hand, the plurality of front-side projecting strip portions 13 extending in the front-rear direction are formed in the narrow width portion 11a of each of the panels 11 and 12. Therefore, the mechanical strength of the narrow width portion 11a against a load applied from the front-rear direction is stronger than those of the front-side wide portion 11b and the rear-side wide portion 11c.

As a result, when the rear collision load F1 is applied to each of the panels 11 and 12, the front-side wide portion 11b and the rear-side wide portion 11c are positively deformed than the narrow width portion 11a. Due to such deformation, the front-side wide portion 11b and the rear-side wide portion 11c absorb the rear collision load F1, and the rear collision load F1 is less likely to be transmitted to a front of the narrow width portion 11a.

In this manner, the above-described vehicle rear portion structure 1 includes the center frame 15 and the bumper beam 21, which is disposed on a rear side of the center frame 15 to be next to the center frame 15, and which is disposed at a position overlapping the center frame 15 when viewed from the front-rear direction. Therefore, from the moment when the rear collision load F1 is applied to the bumper beam 21, while the bumper beam 21 is certainty crushed to certainty absorb the rear collision load F1, the center frame 15 is capable of receiving the rear collision load. Accordingly, it is possible to suppress the peak load of the rear collision load F1, and the rear collision load F1 can be efficiently absorbed.

Figure 5:
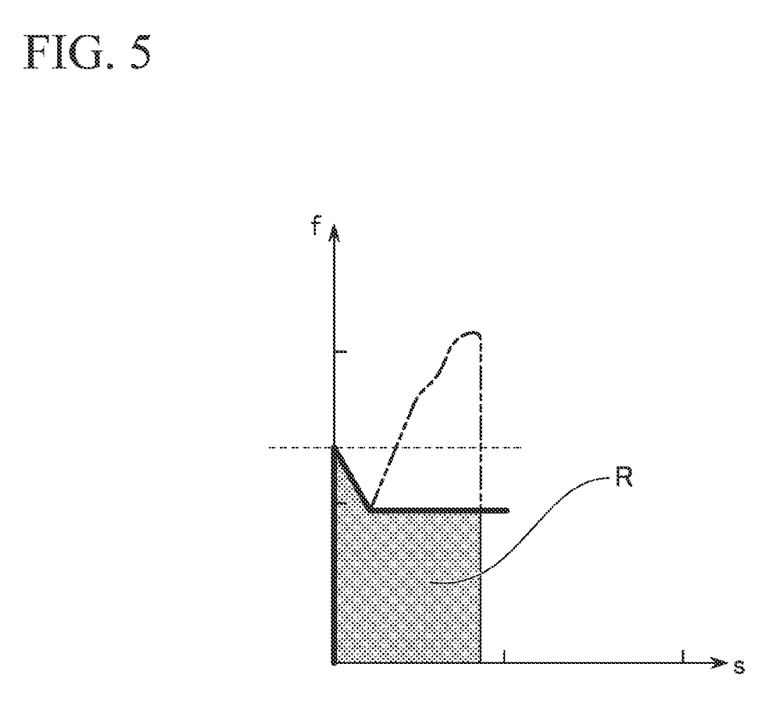
FIG. 5 is a graph illustrating a change in a rear collision load in the vehicle rear portion structure in an embodiment of the present invention.

FIG. 5 is a graph illustrating a change in the rear collision load in the vehicle rear portion structure 1, in a case where the vertical axis represents the magnitude of a rear collision load [f] and the horizontal axis represents a deformation stroke [s] of the vehicle rear portion structure 1. A region R surrounded in FIG. 5 corresponds to absorbed energy for the rear collision load. A region indicated by a two-dot chain line in FIG. 5 indicates a change in the rear collision load in a conventional structure (see JP 2020-199842 A) for comparison. As illustrated in FIG. 5, in the above-described vehicle rear portion structure 1, from the moment when the rear collision load F1 is applied to the bumper beam 21, the bumper beam 21 is caused to be crushed with certainty, so that the rear collision load F1 can be absorbed with certainty. Therefore, it can be confirmed that the peak load is suppressed, and the rear collision load is efficiently absorbed, as compared with the conventional structure.

In addition, the bumper beam 21 is disposed immediately on a rear side of the center frame 15. Therefore, even when an input position of the rear collision load F1 is somewhat shifted from the center in the vehicle width direction, the rear collision load F1 is firstly transmitted to the center frame 15. Accordingly, the vehicle rear portion structure 1 does not receive the rear collision load F1 in an imbalanced manner on the left and the right, and thus the rear collision load F1 can be absorbed in a stable manner.

The rear panel 20 is provided between the center frame 15 and the bumper beam 21. Then, the bumper beam 21 is connected with the center frame 15 through the rear panel 20. Therefore, the rear collision load F1 applied to the bumper beam 21 can also be transmitted to the rear panel 20. In this manner, the rear collision load F1 applied to the bumper beam 21 can be distributed to the rear panel 20 in addition to the center frame 15. Therefore, the rear collision load F1 is not concentrated on any specific component part of the vehicle 100 other than the bumper beam 21. As a result, damage to the vehicle 100 due to the rear collision load F1 can be suppressed with certainty.

The cross member 18 joined to the front end portion 15b of the center frame 15 is included. In addition, the rear side frames 2 respectively joined to the left and right end portions 18b of the cross member 18 are included. Therefore, the rear collision load F1 can be transmitted to the cross member 18 via the center frame 15, and further, the rear collision load F1 can be transmitted to the rear side frames 2 disposed on both side portions in the vehicle width direction. Through the center frame 15, the rear collision load F1 can be equally distributed to both the rear side frames 2 (rear collision loads F2 in FIG. 3). Therefore, damage to the vehicle 100 due to the rear collision load F1 can be suppressed with more certainty.

The cross member 18 extends obliquely gradually forward from the center frame 15 as approaching both outer sides in the vehicle width direction. Therefore, as compared with a case where the cross member 18 extends linearly in the vehicle width direction, the rear collision load F1 transmitted from the center frame 15 can be easily transmitted to the rear side frames 2 located on the front side of the cross member 18.

The center frame 15 extends linearly in the front-rear direction. Therefore, for example, as compared with a case where the center frame 15 is formed in a bent manner, the rear collision load F1 applied to the center frame 15 can be transmitted to the cross member 18 with certainty. Therefore, the rear collision load can be distributed with certainty to the entire rear portion of the vehicle 100.

The second outer flange portion 17 of the center frame 15, the rear panel 20, and the bumper beam 21 are fastened and fixed together at an identical position with the two bolts and nuts 22b and 22c. Therefore, the rear collision load F1 applied to the bumper beam 21 can be efficiently distributed and transmitted to the center frame 15 and the rear panel 20.

The rear floor panel 5 is constituted by a double panel structure 10 including an upper panel 11 and a lower panel 12, which are disposed to face each other in the up-down direction, and which extend horizontally. Therefore, the rear collision load F1 applied to the rear floor panel 5 can be distributed to the upper panel 11 and the lower panel 12. Then, the rear collision load F1 applied to each of the panels 11 and 12 can be reduced as much as possible.

The plurality of rear-side projecting strip portions 14 extending in the vehicle width direction are formed in the front-side wide portion 11b and the rear-side wide portion 11c of each of the panels 11 and 12. Therefore, when the rear collision load F1 is applied to each of the panels 11 and 12, the front-side wide portion 11b and the rear-side wide portion 11c can be positively deformed more than the narrow width portion 11a, so that the rear collision load F1 can be absorbed by the front-side wide portion 11b and the rear-side wide portion 11c. Therefore, it becomes possible to make the rear collision load F1 less likely to be transmitted to a front of the narrow width portion 11a.

The positions of the fixing portions 21d and 21e of the bumper beam 21 are shifted upward with respect to the positions of the flange portions 19a and 19b of the respectively corresponding panels 11 and 12. Therefore, it is possible to suppress the rear collision load F1 applied to the bumper beam 21 from being directly and efficiently transmitted to each of the panels 11 and 12.

On the other hand, the second outer flange portion 17 of the center frame 15 and the lower fixing portion 21e of the bumper beam 21 overlap each other in the front-rear direction. Therefore, the rear collision load F1 can be preferentially transmitted to the center frame 15 to each of the panels 11 and 12. As a result, the function of the center frame 15 can be exhibited in a sufficient manner.

In addition, the positions of the fixing portions 21d and 21e in the bumper beam 21 are shifted upward with respect to the positions of the flange portions 19a and 19b of the respectively corresponding panels 11 and 12. Therefore, in integrating the center frame 15, the bumper beam 21, the rear panel 20, and each of the panels 11 and 12, the following effects are obtained. That is, for example, when spot welding is adopted in fixing the center frame 15, the bumper beam 21, the rear panel 20, and each of the panels 11 and 12, it is possible to avoid spot welding with all of the center frame 15, the bumper beam 21, the rear panel 20, and each of the panels 11 and 12 being overlapped.

Therefore, it is possible to suppress a decrease in strength of the spot welding.

Modifications

Note that the present invention is not limited to the above-described embodiments, and includes various modifications to the above-described embodiments without departing from the scope of the present invention.

For example, in the above-described embodiments, the description has been given for the case where the cross member 18 extends obliquely gradually forward from the center frame 15 as approaching both outer sides in the vehicle width direction. However, without being limited to this, it is sufficient if the cross member 18 is connected with the front end portion 15b of the center frame 15 and is also connected with the rear end portions 2a of the rear side frames 2. In the following, a specific modification of the cross member 18 will be described.

Figure 6:
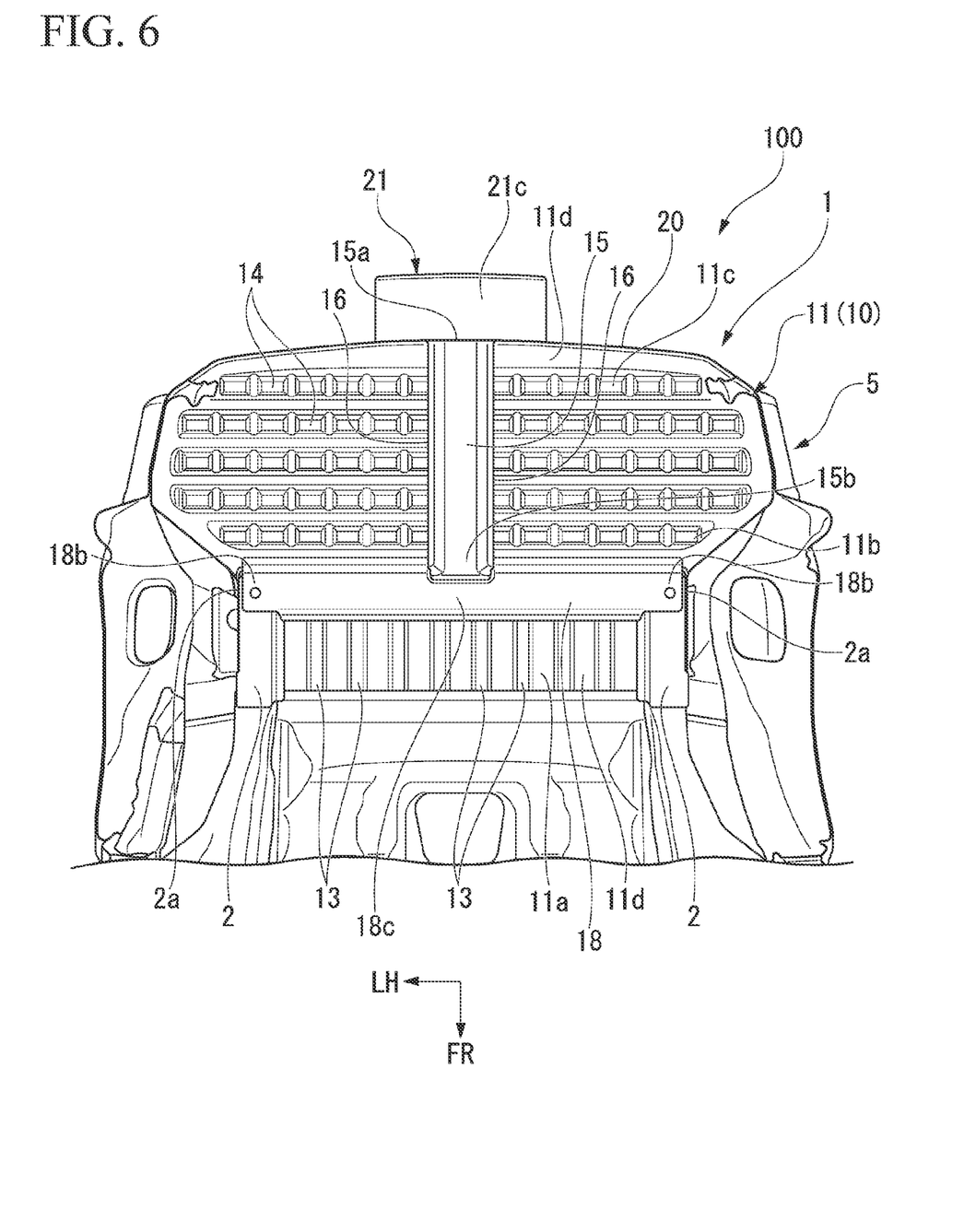
FIG. 6 is a plan view, of the vehicle rear portion structure, illustrating a modification of a cross member, when viewed from a lower side in an embodiment of the present invention.

FIG. 6 is a plan view, of the vehicle rear portion structure 1, illustrating a modification of the cross member 18, when viewed from a lower side. FIG. 6 corresponds to FIG. 3 described above.

As illustrated in FIG. 6, the cross member 18 extends linearly along the vehicle width direction. Both left and right end portions 18b of the cross member 18 are respectively joined to rear end portions 2a of the rear side frames 2.

The center frame 15 extends along the front-rear direction from a rear end portion (each of the flange portions 19a and 19b of the panels 11 and 12) of the rear floor panel 5 to the cross member 18. The front end portion 15b of the center frame 15 is joined to a center portion 18c in the vehicle width direction of the cross member 18.

Therefore, according to the above-described modification, the same effects as those of the above-described embodiments are obtained.

In addition, in the above-described embodiments, the description has been given for the case where the positions of the fixing portions 21d and 21e of the bumper beam 21 are shifted upward with respect to the positions of the flange portions 19a and 19b of the respectively corresponding panels 11 and 12. However, without being limited to this, the positions of the fixing portions 21d and 21e of the bumper beam 21 may be shifted downward with respect to the positions of the flange portions 19a and 19b of the respectively corresponding panels 11 and 12.

In the above-described embodiments, the description has been given for the case where the rear floor panel 5 is constituted by the double panel structure 10 including the upper panel 11 and the lower panel 12, which are disposed to face each other in the up-down direction, and which extend horizontally. However, without being limited to this, the rear floor panel 5 may be constituted by either one of the upper panel 11 or the lower panel 12. In addition, the double panel structure 10 may be formed by aluminum extrusion molding.

In the above-described embodiments, the description has been given for the case where the rear panel 20 is joined to the rear end portion 15a (the second outer flange portion 17) of the center frame 15. However, without being limited to this, the rear panel 20 may be joined to the rear portion of the center frame 15. That is, the rear panel 20 may not necessarily be joined to a completely end portion (the rear end portion 15a) of the center frame 15, and may be joined to a slightly inner side than the end portion (the rear end portion 15a). In this case, the rear portion of the center frame 15 slightly penetrates into the rear panel 20.

In the above-described embodiments, the description has been given for the case where the cross member 18 is joined to the front end portion 15b of the center frame 15. However, without being limited to this, it is sufficient if the cross member 18 is joined to the front portion of the center frame 15. That is, the cross member 18 may not necessarily be joined to a completely end portion (the front end portion 15b) of the center frame 15, and may be joined to a slightly inner side than the end portion (the front end portion 15b). In this case, the front portion of the center frame 15 is slightly inserted into the cross member 18.

In the above-described embodiment, the description has been given for the case where the left and right end portions 18b of the cross member 18 are joined to the rear end portions 2a of the rear side frames 2. However, without being limited to this, the cross member 18 may be joined to the rear portions of the rear side frames 2. That is, the cross member 18 may not necessarily be joined to completely end portions (the rear end portions 2a) of the rear side frames 2, and may be joined to a slightly inner side than the end portions (the rear end portions 2a). In this case, the left and right end portions 18b of the cross member 18 are slightly inserted into the rear side frames 2.

In the above-described embodiments, the length in the vehicle width direction of the bumper beam 21 is approximately three times the width in the vehicle width direction of the center frame 15. However, without being limited to this, the bumper beam 21 may have any shape as long as it is disposed on a rear side of the center frame 15 to be next to the center frame 15, and overlaps the center frame 15 when viewed from the front-rear direction.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle rear portion structure comprising:
a center frame that is disposed closer to a center portion of a vehicle in a vehicle width direction than both side portions of the vehicle in the vehicle width direction, that is disposed on a rear side in the vehicle, and that extends in a front-rear direction of the vehicle;
a bumper beam that is disposed on a rear side of the center frame to be next to the center frame, that is disposed at a position which overlaps the center frame when viewed from a front-rear direction, and that is configured to be crushable due to a rear collision load,
a cross member that is disposed in front of the center frame, and that extends in the vehicle width direction;
side frames respectively disposed on both side portions of the vehicle in the vehicle width direction, and
a rear floor panel disposed at a rear portion of the vehicle,
wherein a front portion of the center frame is connected with the cross member, and both end portions of the cross member in the vehicle width direction are respectively connected with rear end portions of the side frames,
the rear floor panel is constituted by a double panel structure including an upper panel and a lower panel disposed below the upper panel, and
the center frame is provided on a lower surface of the upper panel.

2. The vehicle rear portion structure according to claim 1, further comprising
a rear panel provided between the center frame and the bumper beam, wherein
the bumper beam is connected with the center frame via the rear panel.

3. The vehicle rear portion structure according to claim 1, the cross member extends obliquely gradually forward from the center frame as approaching both outer sides in the vehicle width direction.

4. The vehicle rear portion structure according to claim 3, wherein
the center frame extends linearly in the front-rear direction.

5. The vehicle rear portion structure according to claim 2, wherein
the center frame, the bumper beam, and the rear panel are fixed at an identical position.

6. The vehicle rear portion structure according to claim 1, wherein
the bumper beam is formed in a bent manner so as to bulge rearward between the upper panel and the lower panel,
an upper fixing portion of the bumper beam is shifted in an up-down direction with respect to a rear end of the upper panel, and
a lower fixing portion of the bumper beam is shifted in the up-down direction with respect to a rear end of the lower panel.

7. A vehicle rear portion structure comprising:
a center frame that is disposed closer to a center portion of a vehicle in a vehicle width direction than both side portions of the vehicle in the vehicle width direction, that is disposed on a rear side in the vehicle, and that extends in a front-rear direction of the vehicle;
a bumper beam that is disposed on a rear side of the center frame to be next to the center frame, that is disposed at a position which overlaps the center frame when viewed from a front-rear direction, and that is configured to be crushable due to a rear collision load; and
a rear floor panel disposed at a rear portion of the vehicle,
wherein the rear floor panel is constituted by a double panel structure including an upper panel and a lower panel disposed below the upper panel, and
the center frame is provided on a lower surface of the upper panel.

* * * * *